(12) United States Patent
Steffenino

(10) Patent No.: US 11,873,717 B2
(45) Date of Patent: *Jan. 16, 2024

(54) POLYMER MESH WITH REINFORCING BANDS FOR SKIN CONTROL IN HARD ROCK MINING

(71) Applicant: TENSAR CORPORATION, LLC, Alpharetta, GA (US)

(72) Inventor: John Steffenino, Homer City, PA (US)

(73) Assignee: TENSAR CORPORATION, LLC, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,694

(22) Filed: Apr. 12, 2022

(65) Prior Publication Data
US 2022/0372876 A1 Nov. 24, 2022

Related U.S. Application Data

(63) Continuation of application No. 16/862,894, filed on Apr. 30, 2020, now Pat. No. 11,333,018.
(Continued)

(51) Int. Cl.
*E21D 11/00* (2006.01)
*E21D 11/15* (2006.01)
*G01N 3/20* (2006.01)

(52) U.S. Cl.
CPC .......... *E21D 11/006* (2013.01); *E21D 11/152* (2013.01); *G01N 3/20* (2013.01)

(58) Field of Classification Search
CPC ..... E21D 11/006; E21D 11/152; E02D 17/20; E02D 17/202
(Continued)

(56) References Cited

U.S. PATENT DOCUMENTS 5,091,247 A 2/1992 Willibey et al.
5,735,640 A 4/1998 Meyer et al.
(Continued)

FOREIGN PATENT DOCUMENTS

DE 2437323 2/1976
DE 3213466 10/1983
(Continued)

OTHER PUBLICATIONS

Mark, Christopher et al. Analysis of Roof Bolt Systems; Proceeding of the 20th International Conference on Ground Control in Mining; vol. 253; Jan. 1, 2005.

*Primary Examiner* — Frederick L Lagman
(74) *Attorney, Agent, or Firm* — Jacobson Holman PLLC

(57) ABSTRACT

A polymer mesh for skin control in hard rock mining conditions is provided. The polymer mesh is manufactured using a knitted or woven design that further includes one or more pairs of solid cut-resistant bands. The bands are positioned in pairs, each band in a pair having a width of at least about 2.5" and being generally parallel with the other band. The bands are spaced from one another at a distance of between about 1.5" and about 4" to create a reinforced aperture between the bands. One or more reinforcement bolts are installed within the aperture with the bands on opposing sides of each bolt buffering the edges of the steel plates associated with the bolts to prevent the plates from tearing the polymer mesh.

15 Claims, 14 Drawing Sheets

Related U.S. Application Data

(60) Provisional application No. 62/846,080, filed on May 10, 2019.

(58) Field of Classification Search
USPC .................. 405/302.3, 11, 12; 299/11, 12
See application file for complete search history.

(56) References Cited

U.S. PATENT DOCUMENTS

| | | |
|---|---|---|
| 5,795,099 A | 8/1998 | Parker |
| 5,816,750 A | 10/1998 | Steffenino |
| 6,918,412 B2 | 7/2005 | Pintz |
| 7,166,349 B2 | 1/2007 | Collins |
| 7,393,060 B2 | 7/2008 | Collins |
| 7,523,626 B2 | 4/2009 | Enzien |
| 8,137,033 B1 | 3/2012 | Hinshaw |
| 8,696,251 B2 | 4/2014 | Potvin |
| 11,333,018 B2 * | 5/2022 | Steffenino ............. E21D 11/152 |
| 2012/0099933 A1 | 4/2012 | Beretta |
| 2012/0243949 A1 | 9/2012 | Schneider |

FOREIGN PATENT DOCUMENTS

| | | |
|---|---|---|
| DE | 3310165 | 9/1984 |
| GB | 839527 | 6/1960 |
| GB | 2150950 | 7/1985 |
| GB | 2167788 | 6/1986 |
| WO | 2010099777 | 9/2010 |

* cited by examiner

POLYMER MESH WITH REINFORCING BANDS FOR SKIN CONTROL IN HARD ROCK MINING

CROSS-REFERENCE TO RELATED APPLICATIONS

This application is a continuation application of U.S. application Ser. No. 16/862,894, filed Apr. 30, 2020, now issued as U.S. Pat. No. 11,333,018 B2, which claims the benefit of priority to U.S. Provisional Application for Patent No. 62/846,080, filed May 10, 2019.

BACKGROUND OF THE INVENTION

Field of the Invention

The present invention is related to the field of mining and, more particularly, to a polymer grid or mesh sheet product to cover the roof and walls of a hard rock mine or tunnel passageway for additional support during material extraction operation.

Description of the Related Art

Minerals beneath the ground have been recovered through mining operations for hundreds of years. Mining from deep shafts is made possible through the use of reliable supports to prevent the roof strata from caving in upon the men and equipment working underground.

The primary means of roof support in underground mines and tunnels includes the use of reinforcement bolts placed in the strata. Reinforcement bolts allow the immediate roof and sidewalls around the workers to be secured by either creating a beam effect or by providing anchorage that extends beyond areas of broken strata into structurally competent material. Such bolts vary in function and design and may include resin glue, expansion, expansion anchor, friction, and various combinations thereof such as glue and expansion anchor, etc., with the type of bolt utilized being dependent upon the kind of strata to be secured. For example, resin bolts are typically used in coal mining, while expansion bolts are utilized in tunnels and hard rock. Bolts of these various types are manufactured by a number of companies and are commercially available.

Bolts in hard rock are installed using roof bolting machines or jack leg drills. As used herein in connection with the present invention and hard rock mining, the term "bolt" refers to a bolt that is inserted into the surrounding strata to provide reinforcement and anchorage. Hard rock bolts are not considered "roof bolts" according to the meaning of that term as would be understood in other mining applications by those of skill in the art.

The bolting machines are often self-propelled and allow the operator to perform drilling and bolt insertion in a hands-off method to ensure safety. The bolting machine typically drills a hole in the strata and then inserts a bolt into the hole. The method by which the bolt is secured within the hole is dependent upon the type of bolt being installed as is known in the art.

To minimize failures in the surrounding strata, bolts are installed according to a predetermined pattern that must be approved by the Mine Safety and Health Administration prior to mining activities. Approvals typically dictate that bolts be installed on 3' by 3', 4' by 4', or even 5' by 5' patterns. In addition to the bolts themselves, steel plates are affixed to the bolts to increase bearing surface area against the strata. The plate size is also dictated by the strata reinforcement requirements, with typical sizes being, but not limited to, 4" by 4", 6" by 6" and 8" by 8".

To further increase bearing surface area, many mining applications require the use of wooden header boards, steel or polymer straps, etc., that are either anchored by one bolt or are anchored by a combination of two or more bolts. In addition to bolts, plates and associated hardware, many hard rock, tunneling and coal applications require further means to restrain smaller rock from falling between the bolts. The restraint of such smaller rock is known in the industry as skin control. Skin control may take the form of welded wire mesh, chain link fencing or polymer grids or mesh sheeting products. These mesh or chain link products are secured to the strata using the bolts.

Welded wire mesh and chain link fencing have been used exclusively in hard rock and many coal applications. However, although very strong, these products are hazardous to install, with their weight leading to many back and shoulder injuries while their edges have resulted in lacerations.

In addition to creating problems during original installation, wire mesh and chain link fencing are responsible for problems thereafter as well. Underground tunnels are very confined and, as such, equipment moving within the tunnels is prone to snag the welded wire or chain link panels and bend them so that the wire extends into the passageways where workers are passing to and fro. Workers are often injured by these wires puncturing and/or cutting them as they travel in these areas. In addition, metallic mesh has been shown to demonstrate very limited life in acidic conditions.

To overcome these drawbacks, polymer mesh made of polyester, polypropylene, co-polymer or HDPE compounds has been used with considerable success. Polymer mesh not only provides extreme strength but is also very user-friendly as compared with steel wire. Specifically, polymer mesh is typically one seventh the weight of welded wire mesh, is flexible, is impervious to acid and will not cut or puncture workers if snagged by equipment.

Polymer mesh that includes solid bands to increase the strength of the mesh has been used for longwall take-off screens in the coal industry for several years. This particular mesh is made of polyester and can be manufactured using a knitted or woven design. The bands are typically spaced at regular intervals such as a meter apart, with the width of the bands varying from 3" to over 12" depending upon the application and the strength desired. As the bands are added for overall strengthening, their spacing along the mesh bears no particular relationship with the positioning of the bolts.

While the use of polyester mesh is common in longwall take-off screens in coal mining, polyester mesh has not been used to any significant degree in connection with hard rock conditions where steel plates are used in conjunction with bolts. These steel bolt plates cut or tear the polyester mesh when force is applied to the mesh, causing the mesh to sag or break free and thereby compromising the effectiveness of the mesh in maintaining skin control. This is unfortunate given the many worker safety advantages of polymer mesh.

Therefore a need exists for a polymer mesh that is resistant to being cut and therefore suitable for durable and effective use in hard rock applications.

SUMMARY OF THE INVENTION

In view of the foregoing, the present invention is directed to a polymer mesh that provides skin control in hard rock mining conditions. The polymer mesh is manufactured using a knitted or woven design that includes a first plurality of spaced polymer strands extending in a machine direction, and a second plurality of spaced polymer strands extending in the cross-machine direction. The second plurality of polymer strands intersect with the first plurality of machine direction polymer strands in a generally perpendicular relation to create a generally rectangular mesh opening structure. The polymer mesh is preferably formed as a roll to be unwound and secured to the roof and side walls of the hard rock mine. Alternatively, the polymer mesh may be cut into sheets and then installed.

The polymer mesh further includes at least one pair of solid cut-resistant bands or reinforcing straps that extend across the length or the width of the roll. As used herein, "solid" is defined as being a single band of continuous material or as a band made of a plurality of closely adjacent strands that together function as an uninterrupted single band, similarly to the manner of fiber-reinforced tape.

Without being limited thereto, each band in the pair preferably has a width of at least about 2.5" and is generally parallel with the other band. The bands are spaced from one another at a distance of at least the diameter of the applicable bolt. However, it is preferred that the spacing be at least about 1.5" and up to about 4" to provide sufficient room to allow the hole to be drilled without having the tool catch on the mesh, followed by placement of the bolt in the hole. The spacing thus creates a reinforced aperture between the bands with sufficient room to allow for ease of installation. The reinforced aperture is elongated, extending along the length of the bands, and is traversed by the polymer strands that extend in the direction transverse to the direction of the bands, creating a plurality of segments in the reinforced aperture.

According to a preferred embodiment, the polymer mesh includes a plurality of pairs of solid cut-resistant bands, also referred to as reinforcing straps, with a spaced interval between pairs corresponding with the spacing of the intended pattern of bolts to be installed in a hard rock mining application. The bolts with associated steel plates, which are typically square or rectangular, are used to secure the polymer mesh to the strata, with the bolts being received within any of the segments within the reinforced apertures.

The width of the reinforcing straps is sufficient to ensure that a minimum of two opposed edges and all four corners of the square or rectangular steel plate used with each of the bolts rest on top of the bands. The bands are thus positioned between the steel plate and the anchoring strata and protect the mesh product from the cutting action of the edges and corners of the steel plates. The width of the bands is sufficient so that in worst case, which can occur when the bolt rides against the opposite end of the reinforced aperture and shifts the bolt plate, the band is still wide enough to cover the plate edges.

The polymer mesh may be manufactured to include solid bands in the machine direction, i.e., the length of the roll; in the cross-machine direction, i.e., the width of the roll; or in both directions. The bands are also effective in buffering the edges of steel plates that are circular or oblong in shape. Plate sizes may vary from about 4" by 4" to about 12" by 12". As used herein in connection with the aperture size and plate sizes, "about" is intended to refer to the stated value plus or minus 1.0". As used in connection with the width of the bands, the term "about" is intended to refer to the stated value plus or minus 0.5". Accordingly, the width of the bands is between 2.25" and 4.25", but could be wider with larger size plates.

Accordingly, it is an object of the present invention to provide a polymer mesh used for skin control in hard rock mining conditions that is manufactured using a knitted or woven design and that includes one or more pairs of solid cut-resistant bands that extend along the length or across the width of the roll.

Another object of the present invention is to provide a polymer mesh in accordance with the preceding object in which each band in a pair has a width of at least about 2.5" to up to 4", and possibly more, and is generally parallel with the other, the bands being spaced from one another by at least the diameter of the applicable bolt, and preferably between about 1.5" and about 4", to create an elongated reinforced aperture for receiving a bolt having an associated steel plate.

A further object of the present invention is to provide a polymer mesh in accordance with the preceding objects in which the width of the bands is sufficient to ensure that a minimum of two opposed edges, and all four corners, of a square or rectangular steel plate used with each of the bolts rest on top of the bands, the bands being positioned between the steel plate and the anchoring strata and protecting the mesh product from the cutting action of the edges and corners of the steel plates.

Yet another object of the present invention is to provide a polymer mesh in accordance with the preceding objects in which the polymer mesh includes a plurality of pairs of solid cut-resistant bands with a spaced interval between the pairs corresponding with the spacing of the intended pattern of bolts to be installed in a hard rock mining application.

Still another object of the present invention is to provide a polymer mesh in accordance with the preceding objects in which the solid bands are manufactured in the machine direction, in the cross-machine direction, or in both directions.

A further object of the present invention is to provide a polymer mesh in accordance with the preceding objects in which the reinforced aperture is effective to buffer the edges of steel plates sized between about 4" by 4" to about 12" by 12", and is also effective in buffering the edges and corners of steel plates that are circular or oblong in shape.

Yet a further object of the present invention is to provide a polymer mesh in accordance with the preceding objects in which the polymer mesh is formed into a roll that is unwound while being installed in a hard rock mining application or is cut into sheets and then installed.

Another object of the present invention is to provide a polymer mesh for being secured to a mine strata for skin control, the polymer mesh having reinforcing straps that are sized and spaced along the polymer mesh according to the size of the plates and bolts to be used to install the polymer mesh and support the mine strata.

Yet another object of the present invention is to provide a polymer mesh in accordance with the preceding objects that is cost-effective to manufacture, user-friendly to handle and install, and effective in containing small rocks and strata while resisting cutting and tearing for improved safety in a hard rock mine.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
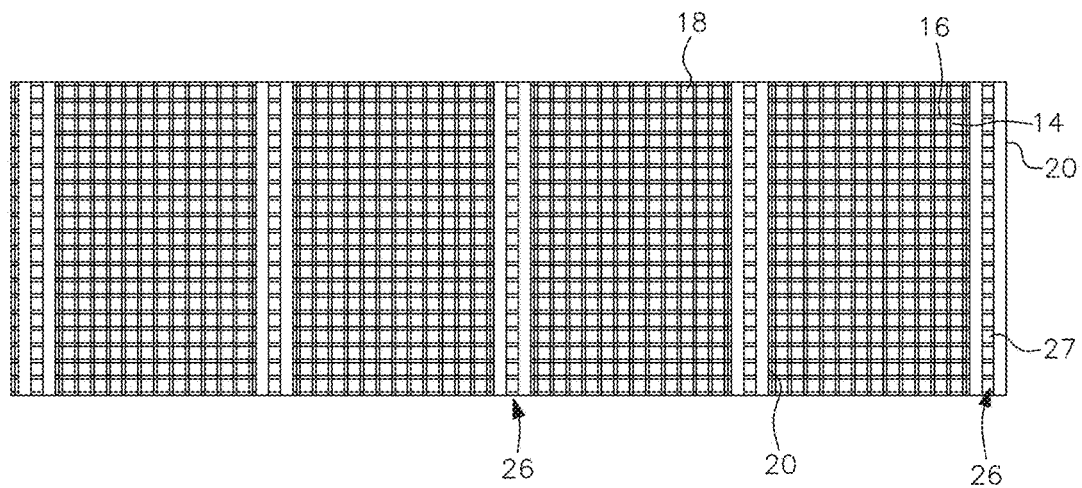
FIG. 1 is a plan view of a polymer mesh with solid cut-resistant bands for hard rock mining in accordance with the present invention.

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 2:
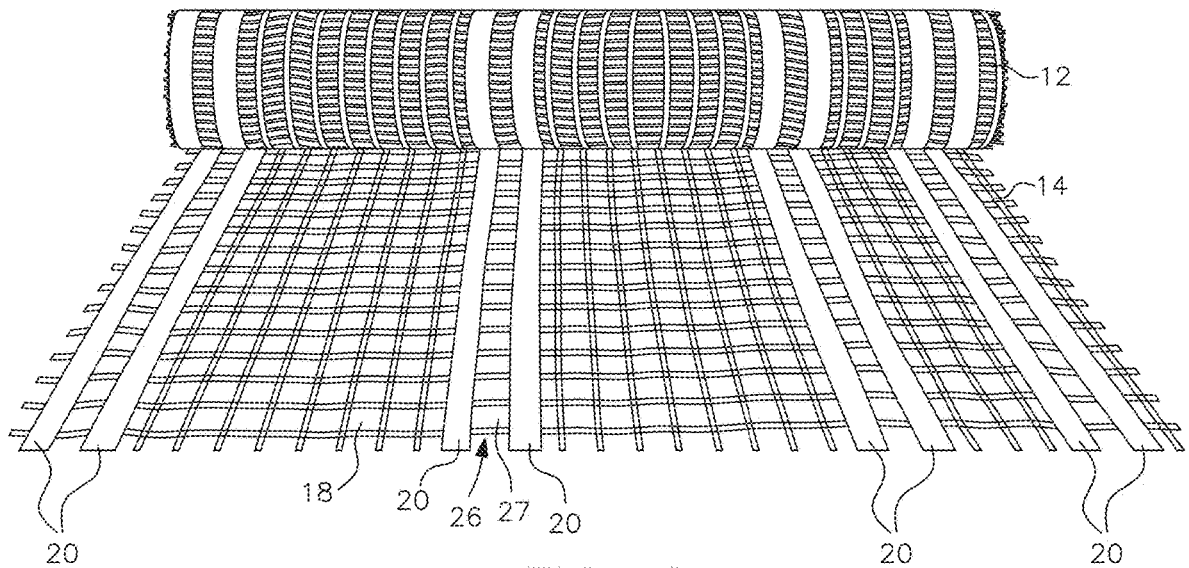
FIG. 2 shows a roll of a polymer mesh having four pairs for solid bands extending in the machine direction in accordance with the present invention.
Figure 3:
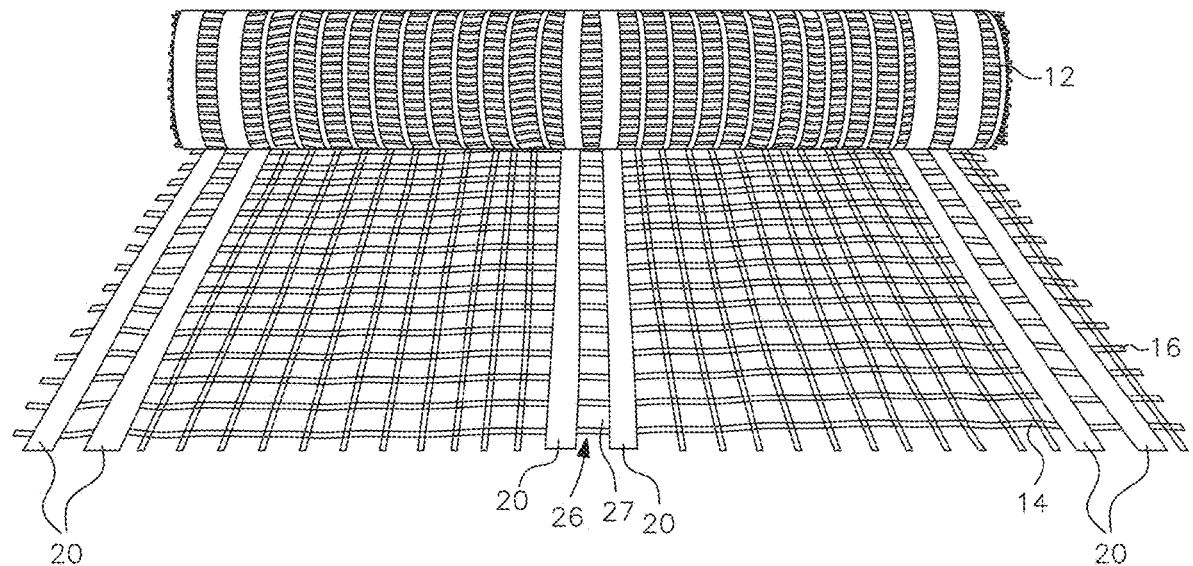
FIG. 3 shows a roll of a polymer mesh having three pairs of solid bands extending in the machine direction in accordance with the present invention.

As shown in FIG. 1, the present invention is directed to a polymer mesh generally designated by reference numeral 10. As shown in FIGS. 2 and 3, the polymer mesh 10 is formed as a roll 12 to be unrolled and secured to a mine roof for skin control, particularly in a hard rock mine.

The polymer mesh includes a first plurality of polymer strands 14 that extend in a machine direction, and a second plurality of strands 16 that extend in the cross-machine direction. The first plurality of polymer strands are spaced from and substantially parallel with one another. Similarly, the second plurality of polymer strands are spaced from and substantially parallel with one another. The second plurality of polymer strands intersect with the first plurality of machine direction polymer strands in a generally perpendicular relation to create a mesh structure having generally square or rectangular mesh openings 18, as shown in FIG. 1. As used herein, "substantially parallel" refers to an arrangement that the skilled person would recognize as parallel in nature but not with mathematical precision. Similarly, openings that are "generally square or rectangular", and strands that are in a "generally perpendicular relation" refer to arrangements that the skilled person would recognize as corresponding to the indicated shape or relation but without requiring mathematical precision in such shapes and relations.

According to the present invention, the polymer mesh 10 includes at least one pair of solid cut-resistant bands generally designated by reference numeral 20. As shown in FIGS. 1-3, the solid bands 20 have a length that extends in the machine direction 22. However, the polymer mesh 10 may be manufactured with the solid bands (not shown) extending in the cross-machine direction 24 or with solid bands that extend in both the machine and cross-machine directions. Whether extending in either or both directions, the solid bands have a width of at least about 2.5" to buffer the edges and corners of the steel plates that are used with bolts to secure the polymer mesh 10 and provide support to the roof and side walls in a hard rock mining application as will be further discussed hereinafter.

As shown in FIG. 1, a plurality of pairs of solid bands 20 are spaced about 4 feet from one another for a 4 foot bolting pattern. As used herein in connection with spacing between pairs of bands, the word "about" refers to the stated value plus or minus 0.5 ft. The bands in each pair are substantially parallel with one another and separated by a distance of at least the diameter of the intended bolt, and preferably between about 1.5" and about 4", as measured from the inner edge of one band to the inner edge of the other band in the pair, and more preferably about 2.5", to create a reinforced aperture, generally designated by reference numeral 26, between the bands. The reinforced aperture is elongated, extending along the length of the bands, and is traversed by the polymer strands 16 that extend in the cross-machine direction, creating a plurality of generally rectangular segments 27 in the reinforced aperture 26. A bolt may be installed within any of these segments of the reinforced aperture.

It should be noted that as the reinforced aperture increases in length and width, the width of the solid band must also be increased to ensure direct contact with the edges and corners of the steel plates. Therefore, upon selecting a band spacing and resulting reinforced aperture size from within the range of values provided herein, the width of the bands must be adjusted to ensure that the band is wide enough to cover the plate edges and corners even if the bolt rides against the opposite end of the reinforced aperture and creates a corresponding shift in the position of the bolt plate.

Figure 4:
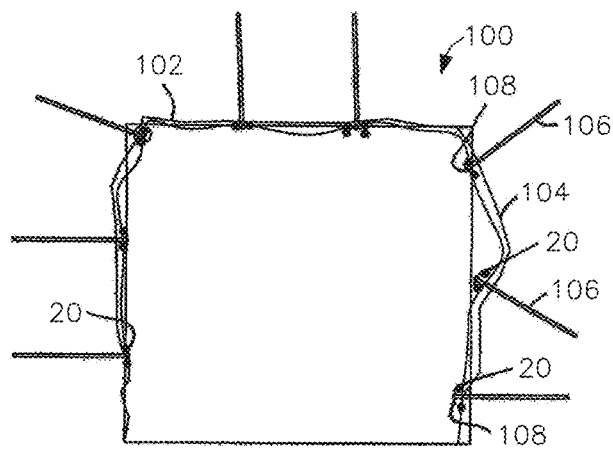
FIG. 4 is a cross-sectional view of a mine tunnel having a roof and side walls to which two rolls of the polymer mesh shown in FIG. 1 have been affixed with bolts.
Figure 5:
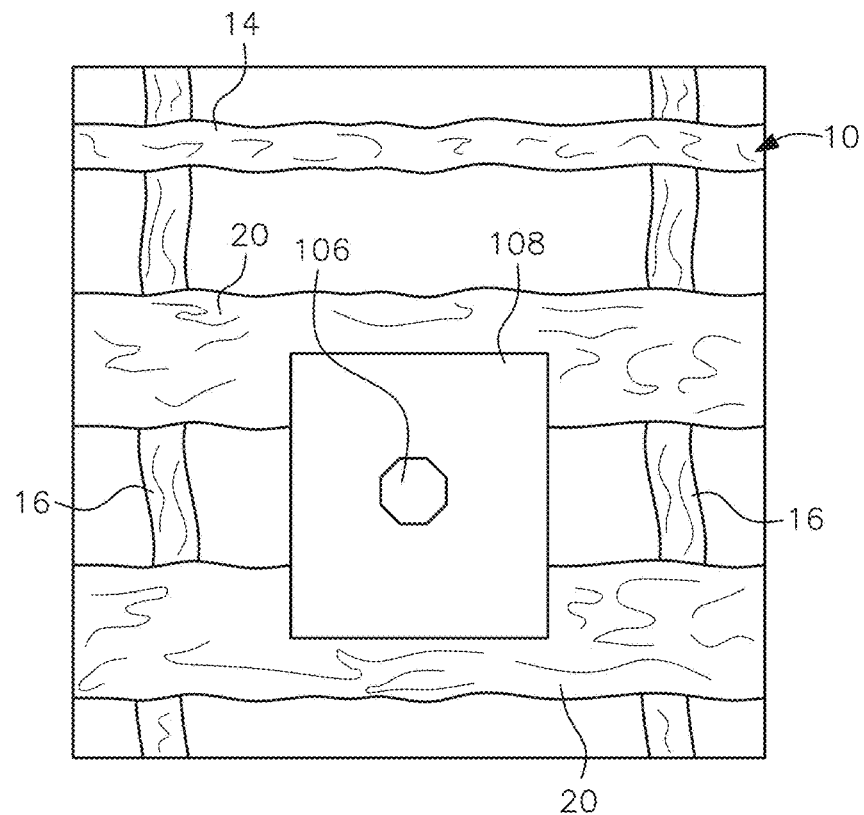
FIG. 5 is a plan view of the polymer mesh as secured to a mine strata using a bolt with a steel plate having two opposed sides buffered by a solid band.

In a hard rock mine, the bolts are installed with associated plates which are typically rectangular and made of steel. FIG. 4 shows a representative cross sectional view of a mine tunnel, generally designated by reference numeral 100, having a roof 102 and side walls 104 to which two panels of the polymer mesh 10 have been affixed with bolts 106 having steel plates 108 to secure the roof and side walls of the mine. The bands 20 are manufactured with sufficient width to ensure that a minimum of two edges and all four corners of the square or rectangular steel plate 108 used with each of the bolts 106 rest on top of the bands 20 as shown in FIG. 5. The bands are thus positioned between the steel plate and the anchoring strata and protect the mesh product from the cutting action of the steel plates as shown in FIG. 4.

As also shown in FIG. 4, the polymer mesh may be installed with two rolls that overlap, or with cut sheets that overlap, in order to cover the desired area. In this overlapped configuration, the solid bands add significant reinforcement and cut resistance. According to one arrangement, the bands of the overlapping mesh are positioned to rest on top of the bottom mesh and then the bolt is inserted through the overlapped reinforced apertures of the top and bottom mesh layers. The result is that the seam or overlapped portion has even greater strength than the single mesh layer portions of the installed polymer mesh.

Figure 6:
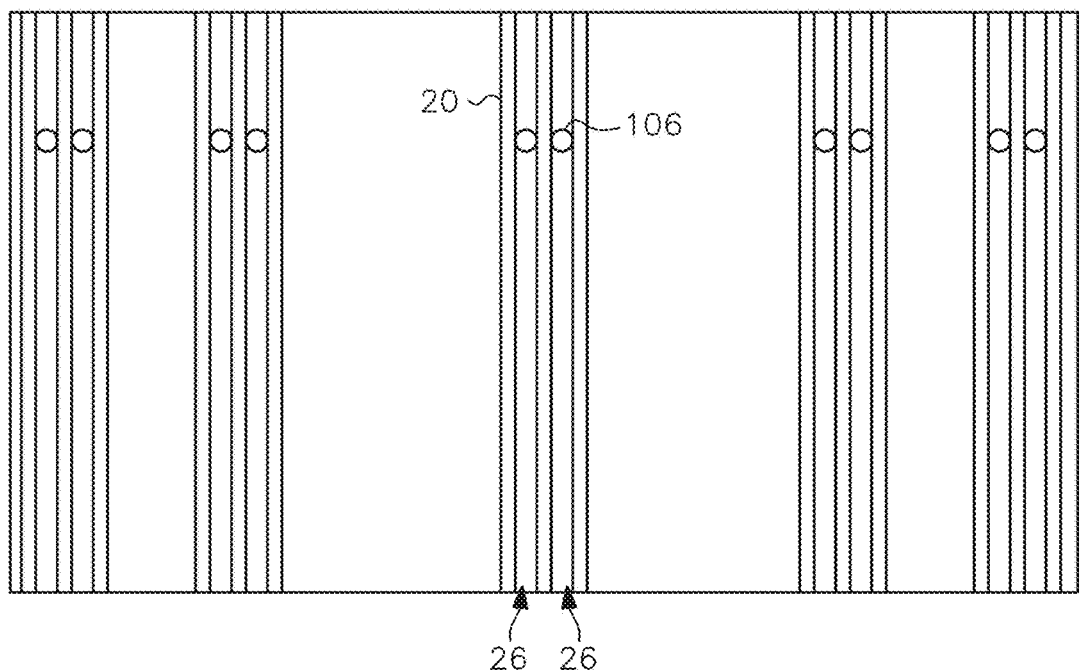
FIG. 6 is a plan view of a polymer mesh having solid cut-resistant bands arranged in groups of three according to a second embodiment of the present invention.

FIG. 6 illustrates a polymer mesh layout having solid bands 20 in groups of three to define two elongated apertures per band group according to a second embodiment of the present invention. The polymer strands of the underlying mesh that extend in the machine and cross-machine directions are not shown for greater clarity in illustration of the solid bands 20. The bands are about 3" wide and are spaced from one another by about 2.5". Bolts may be installed within either of the elongated apertures 26 created by the three grouped bands as shown. This arrangement, in which the band groups have a spacing center-to-center of about 4 feet, for a 4 foot by 4 foot bolting pattern, is suitable for use with 6" by 6" steel plates.

Figure 7:
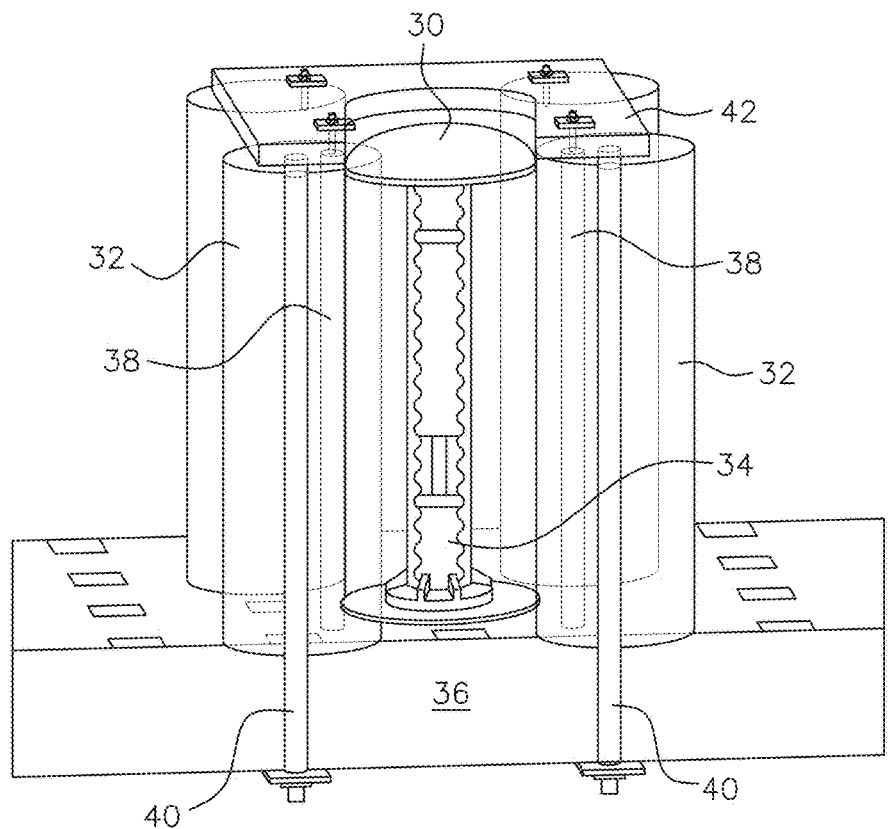
FIG. 7 shows test conditions for Tests 1-4 used in developing the polymer mesh according to the present invention.

The effectiveness of the solid cut-resistant bands was confirmed through a series of tests that were conducted at NIOSH Spokane in January 2019. The test conditions included a domed ram head 30 having a 24" total ram stroke, concrete reaction columns 32, a 1,500 kN jack 34 positioned atop a reaction floor 36, rock bolts 38, and load bolts 40, as shown in FIG. 7. The ram head 30 was roughly even with the tops of the columns 32 as shown. Product samples 42 were restrained on top of the ram head in its lowered position using four D-bolts at 4" spacing with 6" bolt boards and 6" square plywood boards having a center hole to receive the bolt and referred to in the text associated with FIGS. 7, 8A, 8B, 9A, 9B, 10A, 10B, 11A, and 11B as "holy boards". The holy boards were used during testing to keep the polymer grid from slipping so an accurate strength test could be performed. Following upward movement of the ram head, the displacement of the product sample was measured.

Figure 8A:
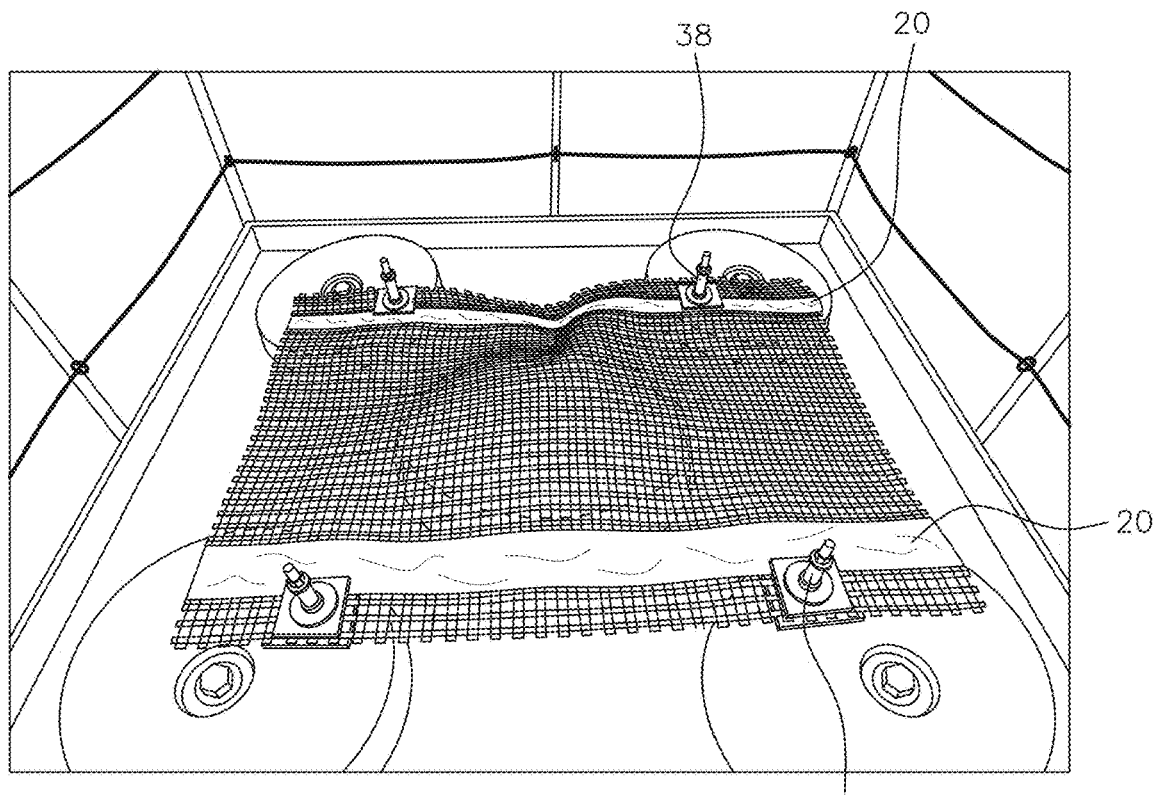
FIGS. 8A and 8B illustrate the start and finish of Test 1, respectively.
Figure 8B:
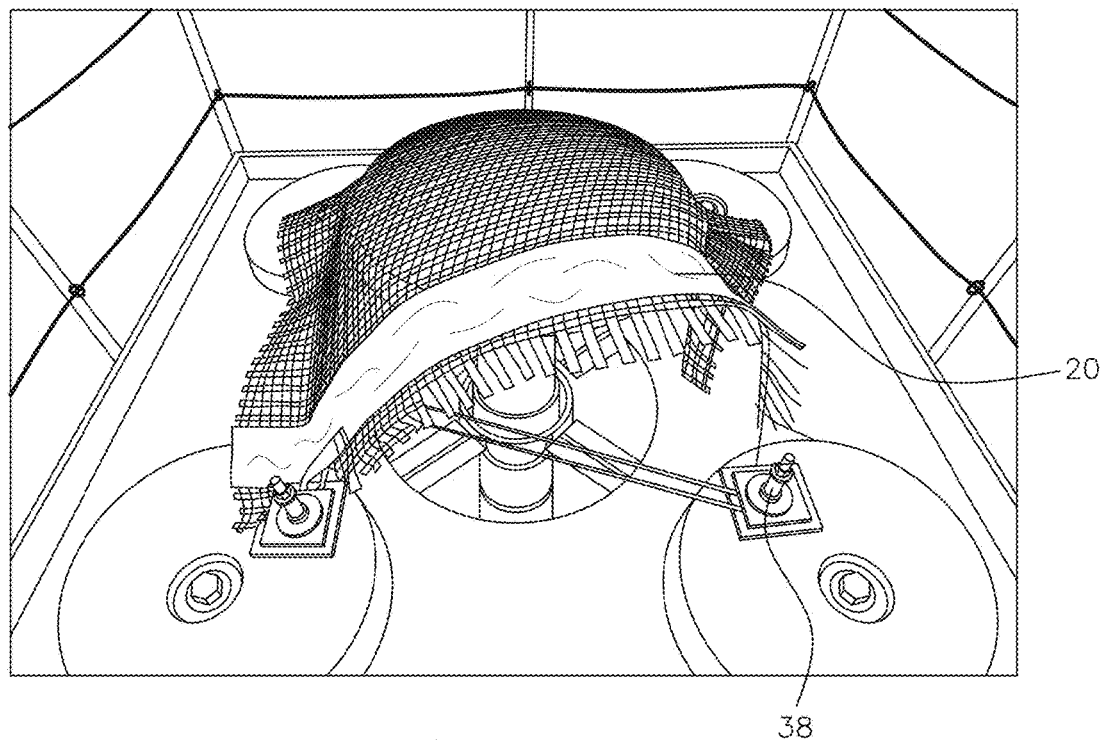
Figure 8C:
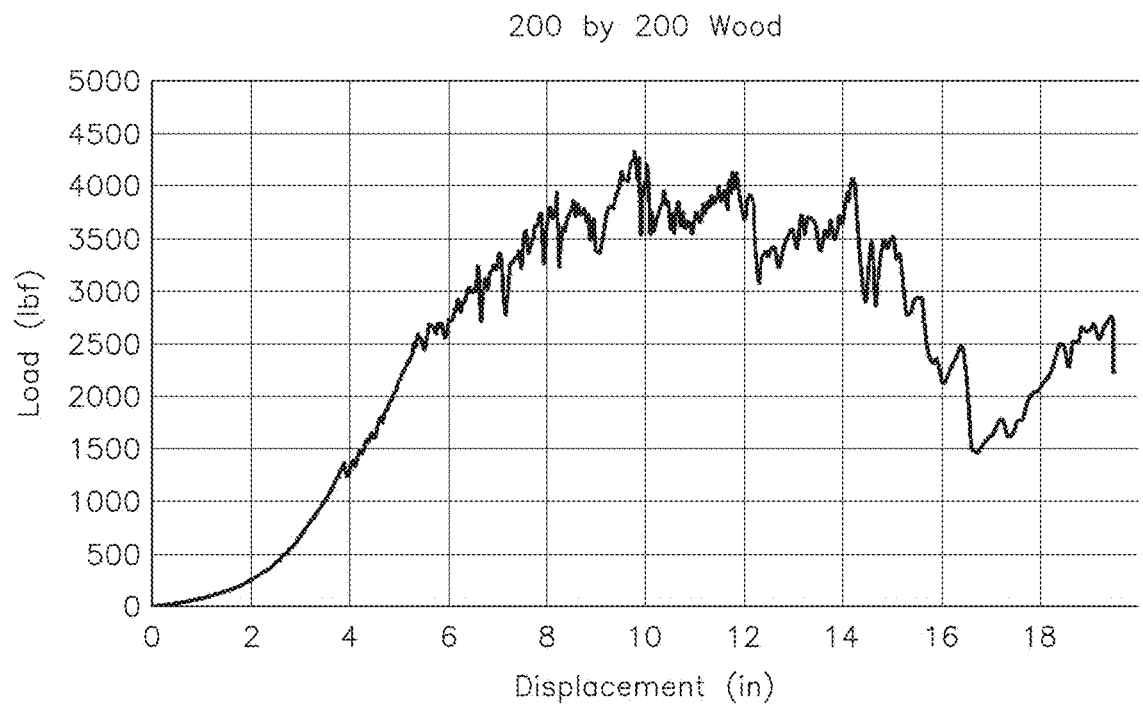
FIG. 8C is a graph of the load (lbf) versus displacement (in) results of Test 1.

In Test 1, referred to as the "200 by 200 Wood" test and having a single board, the installation sequence for the product sample was 1) holy board; 2) mesh; and 3) bolt plate. All four bolts 38 were placed outside of the solid bands 20, referred to in the test data as reinforcing straps. The peak load was 4315 lbf, displacement at peak load was 9.7 inches, and maximum displacement was 19.5 inches. Illustrations showing the start and finish of Test 1 are set forth in FIGS. 8A and 8B, respectively. A graph of the load (lbf) versus displacement (in) for the 200 by 200 Wood test is shown in FIG. 8C.

Figure 9A:
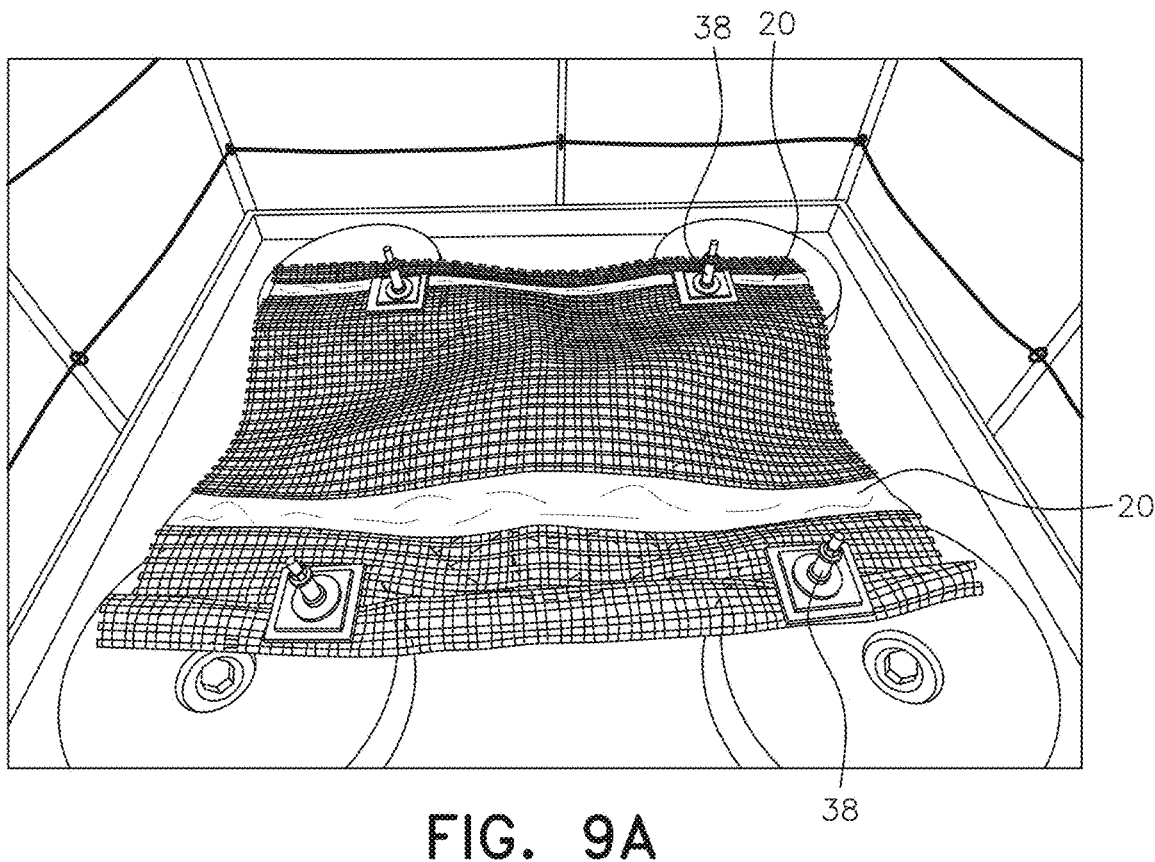
FIGS. 9A and 9B illustrate the start and finish of Test 2, respectively.
Figure 9B:
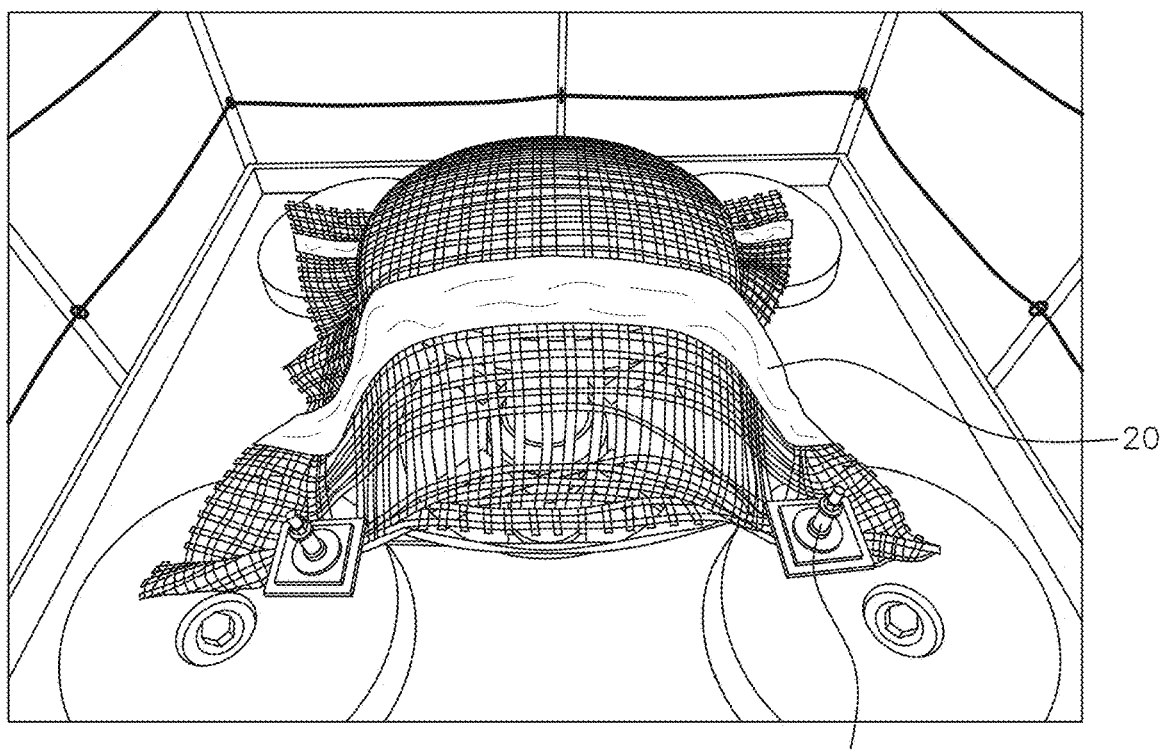
Figure 9C:
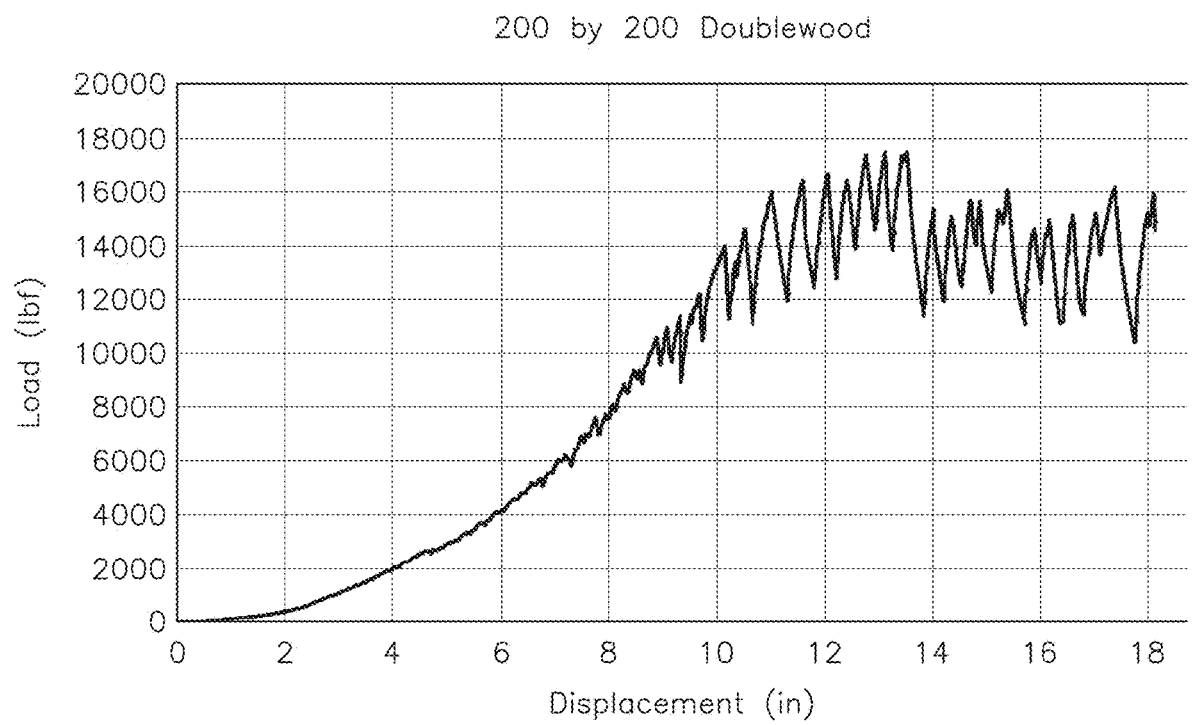
FIG. 9C is a graph of the load (lbf) versus displacement (in) results of Test 2.
Figure 9D:
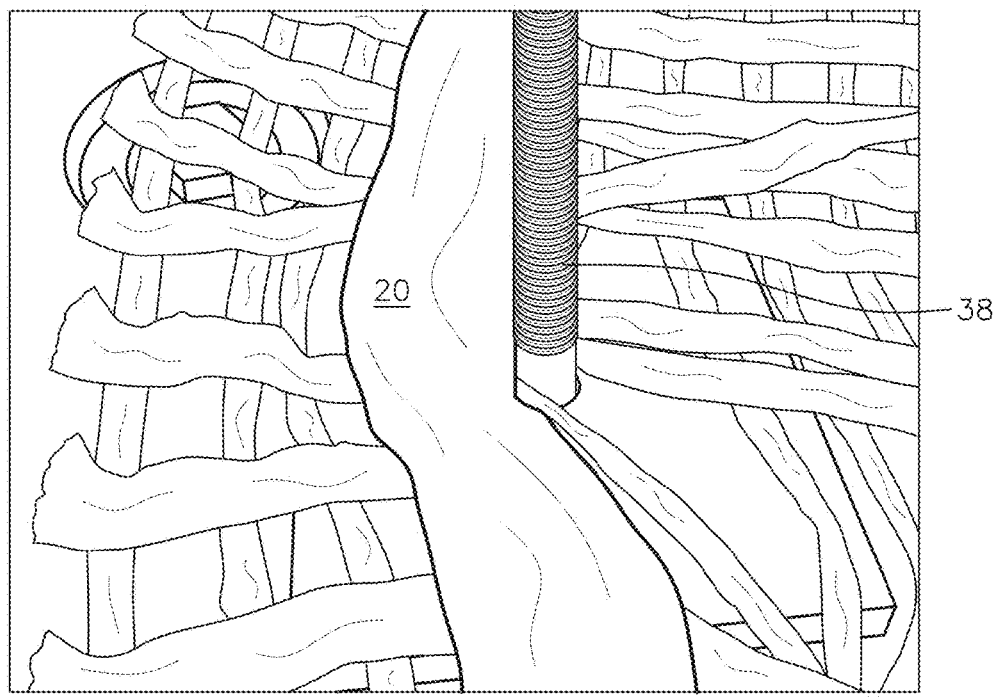
FIGS. 9D and 9E illustrate the reinforcing band after the completion of Test 2.
Figure 9E:
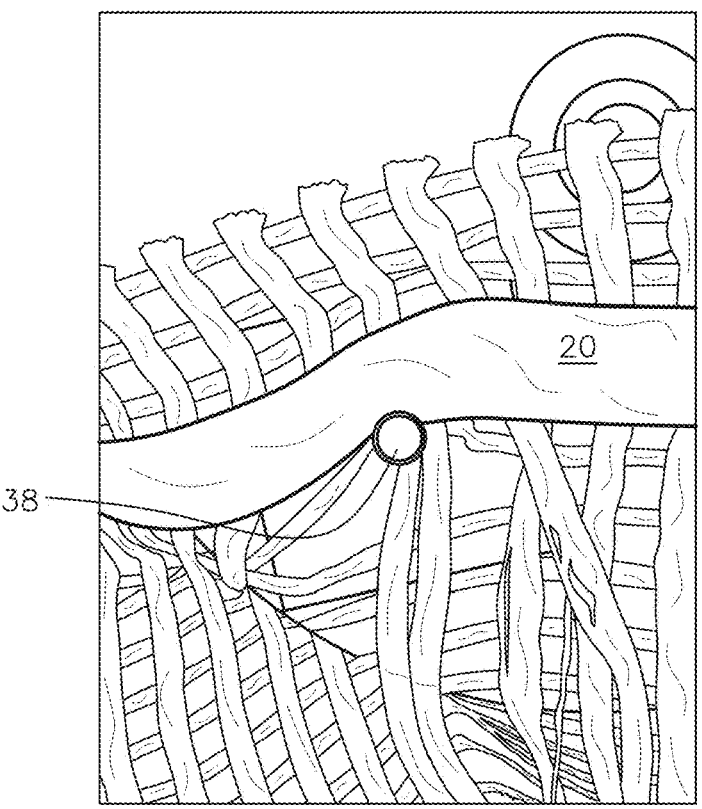

In Test 2, referred to as the "200 by 200 Doublewood" test and having two boards, the installation sequence for the product sample was 1) holy board; 2) mesh; 3) holy board; and 4) bolt plate. Two bolts 38 were placed outside of the reinforcing strap 20 with the mesh double-folded underneath, and two bolts 38 were placed inside the reinforcing strap 20 (see FIG. 9A). The peak load was 17465 lbf, displacement at peak load was 13.5 inches, and maximum displacement was 18.1 inches. Illustrations showing the start and finish of Test 2 are set forth in FIGS. 9A and 9B, respectively. A graph of the load (lbf) versus displacement (in) for the 200 by 200 Doublewood test is shown in FIG. 9C. Illustrations of the strap performance at the conclusion of Test 2 are provided in FIGS. 9D and 9E.

Figure 10A:
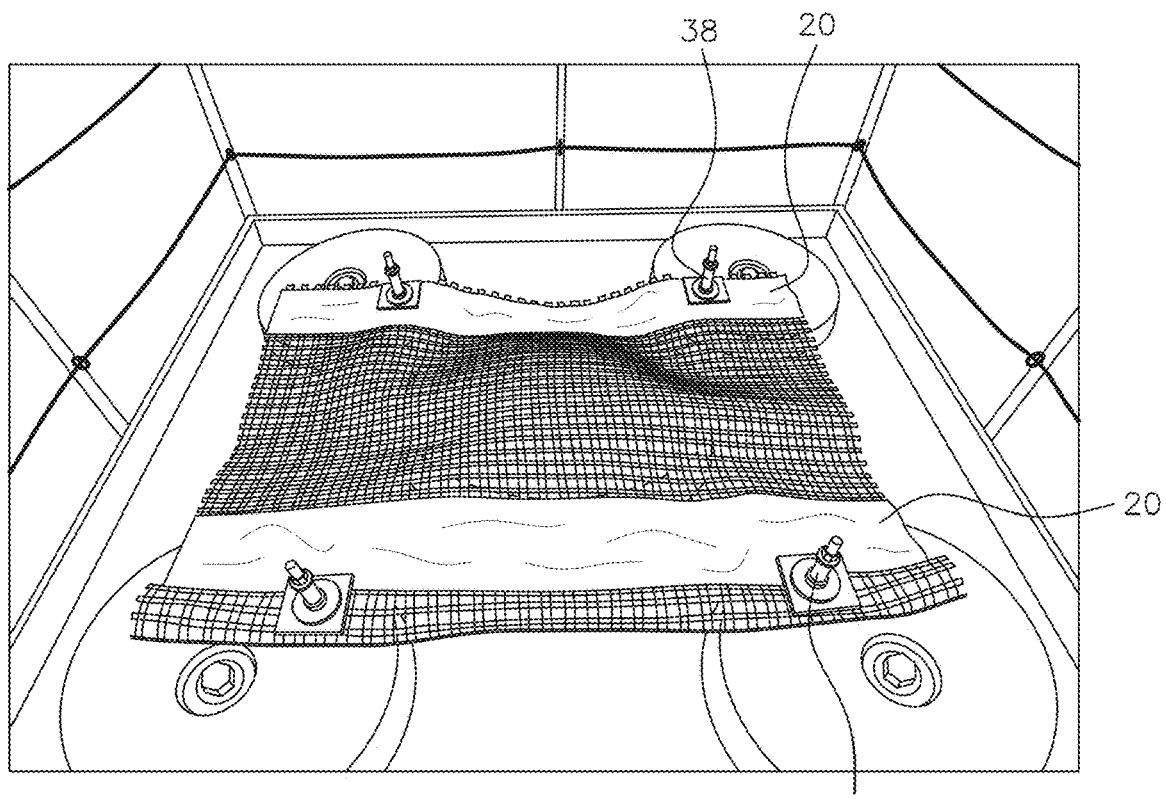
FIGS. 10A and 10B illustrate the start and finish of Test 3, respectively.
Figure 10B:
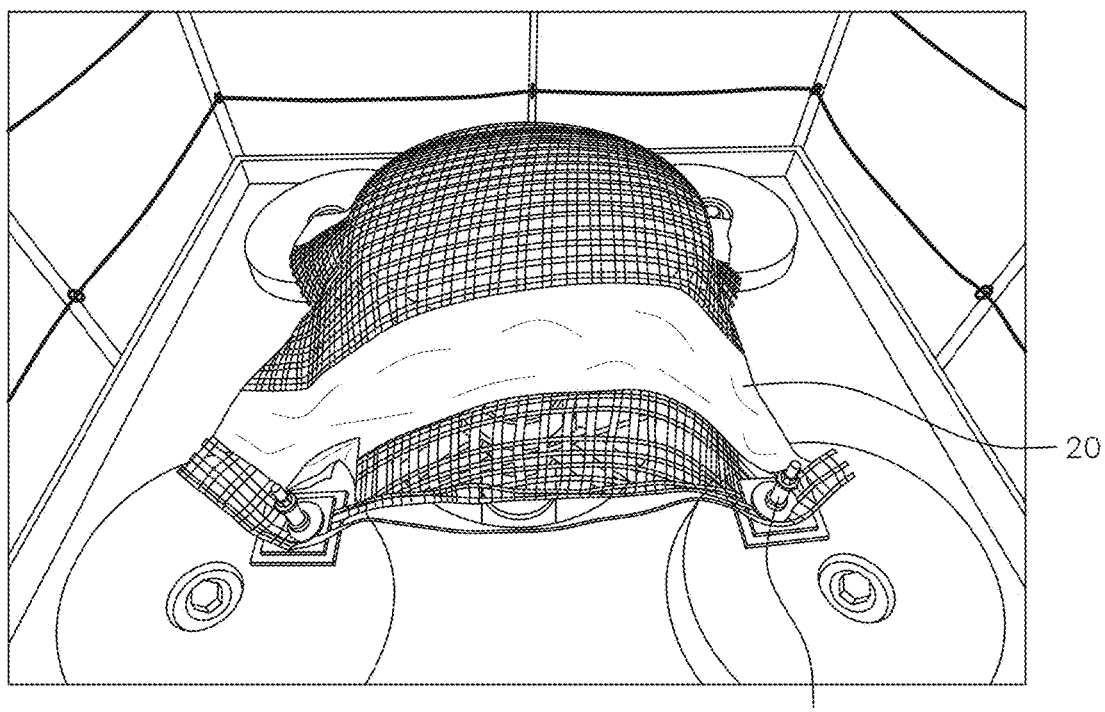
Figure 10C:
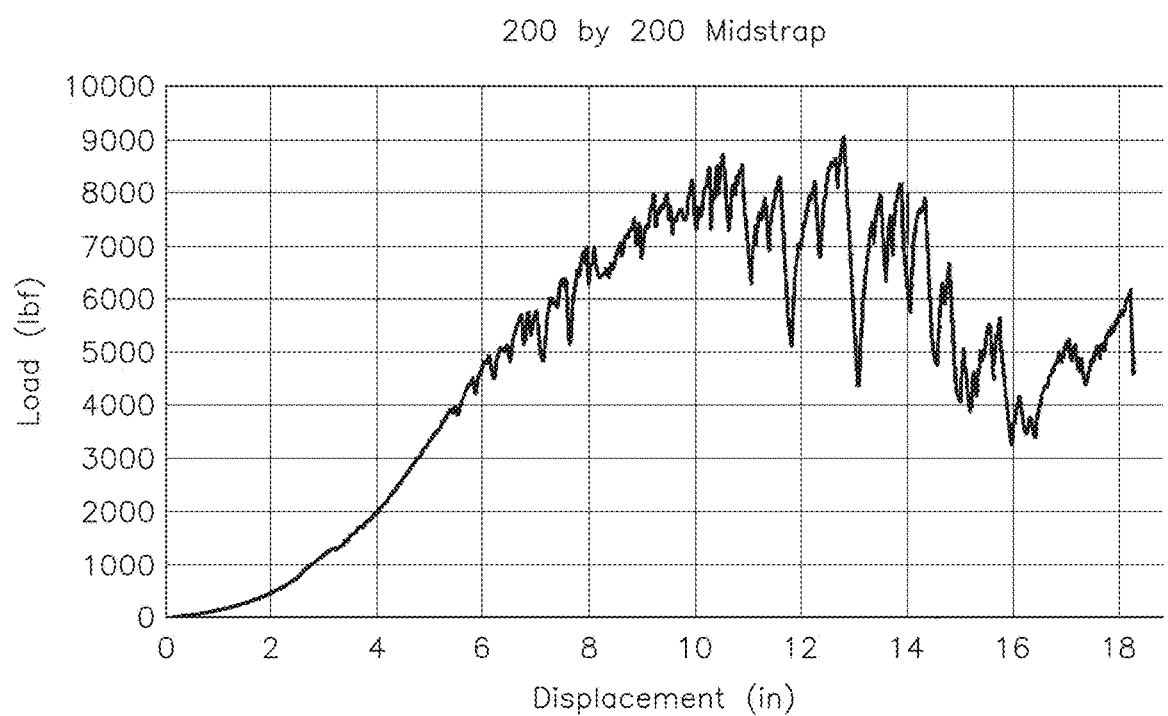
FIG. 10C is a graph of the load (lbf) versus displacement (in) results of Test 3.

In Test 3, referred to as the "200 by 200 Midstrap" test, the installation sequence for the product sample was 1) holy board; 2) mesh; and 3) bolt plate. Two bolts 38 were placed outside of the reinforcing strap 20 with the mesh double-folded underneath, and two bolts 38 were placed through the reinforcing strap 20. The peak load was 9045 lbf, displacement at peak load was 12.8 inches, and maximum displacement was 18.3 inches. Illustrations showing the start and finish of Test 3 are set forth in FIGS. 10A and 10B, respectively. A graph of the load (lbf) versus displacement (in) for the 200 by 200 Midstrap test is shown in FIG. 10C.

Figure 11A:
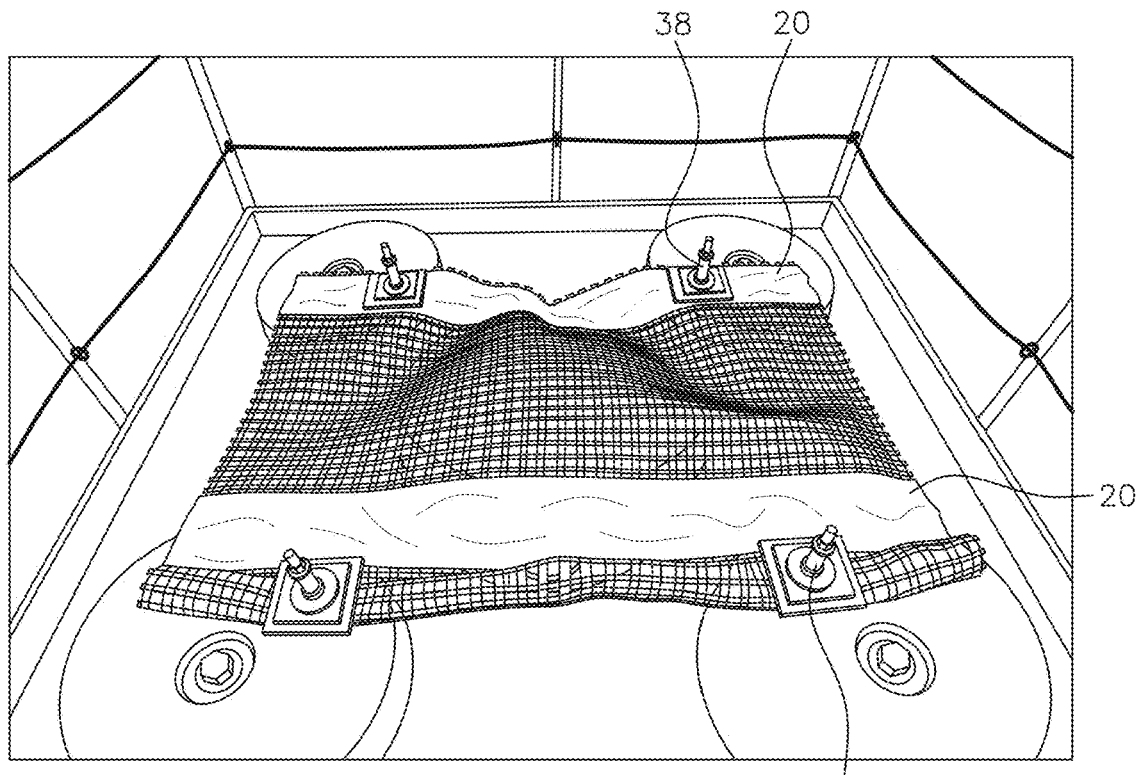
FIGS. 11A and 11B illustrate the start and finish of Test 4, respectively.
Figure 11B:
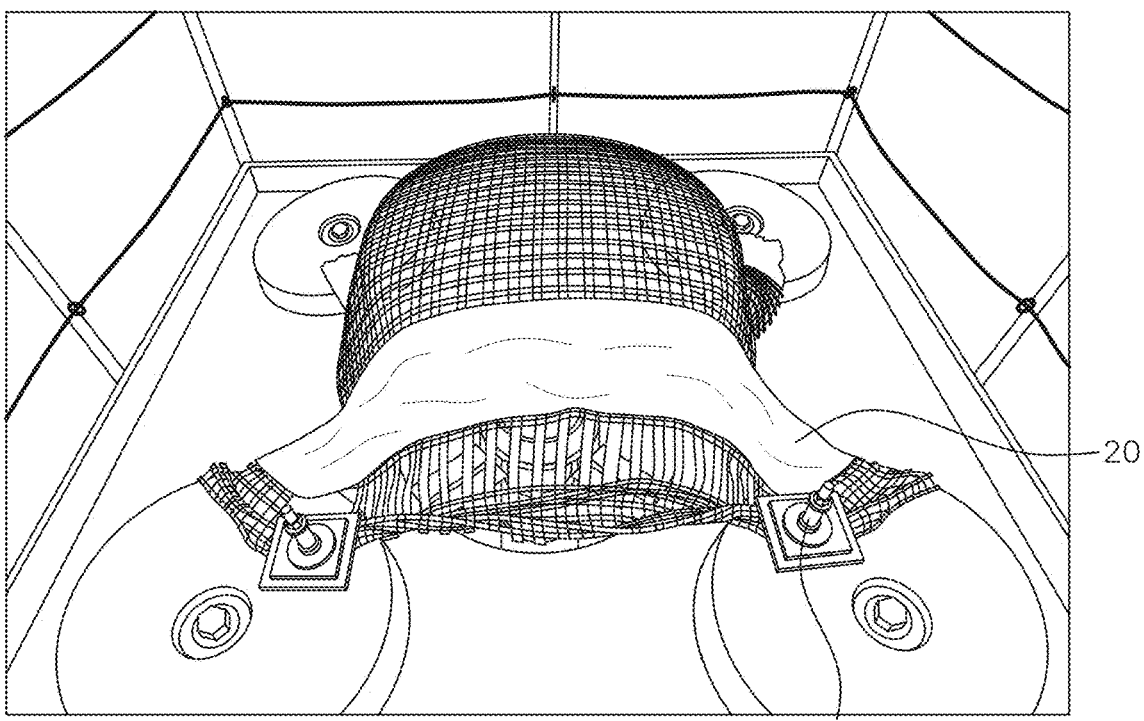
Figure 11C:
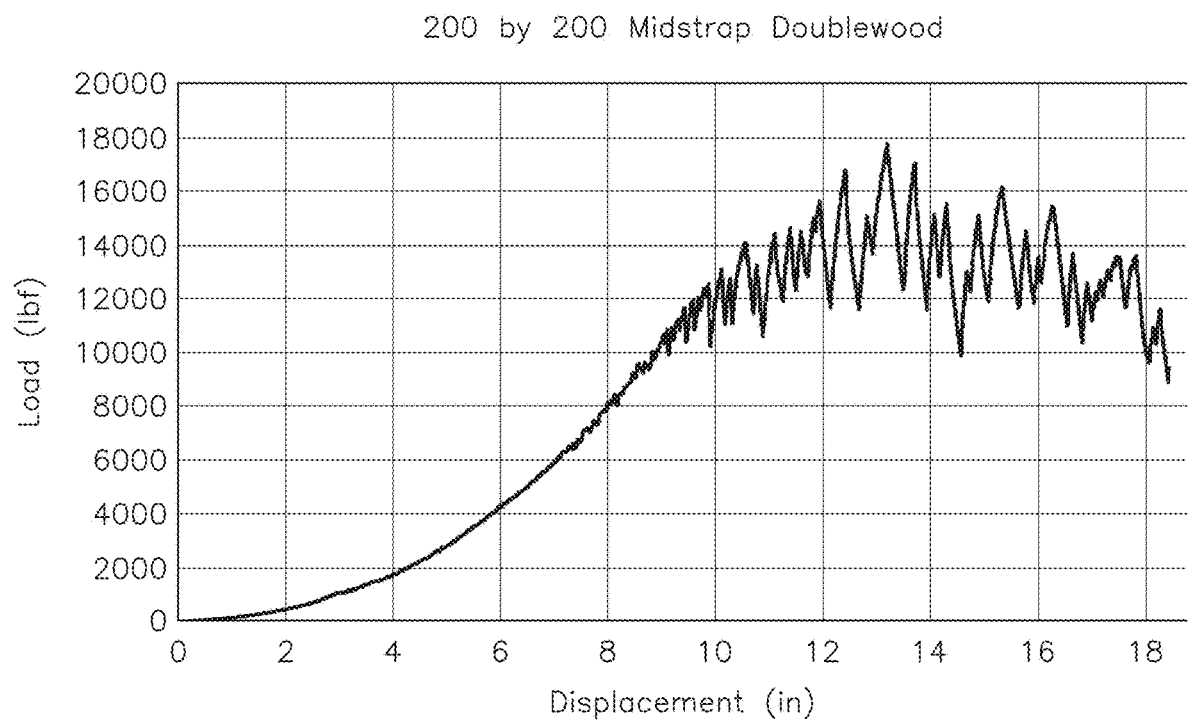
FIG. 11C is a graph of the load (lbf) versus displacement (in) results of Test 4.
Figure 11D:
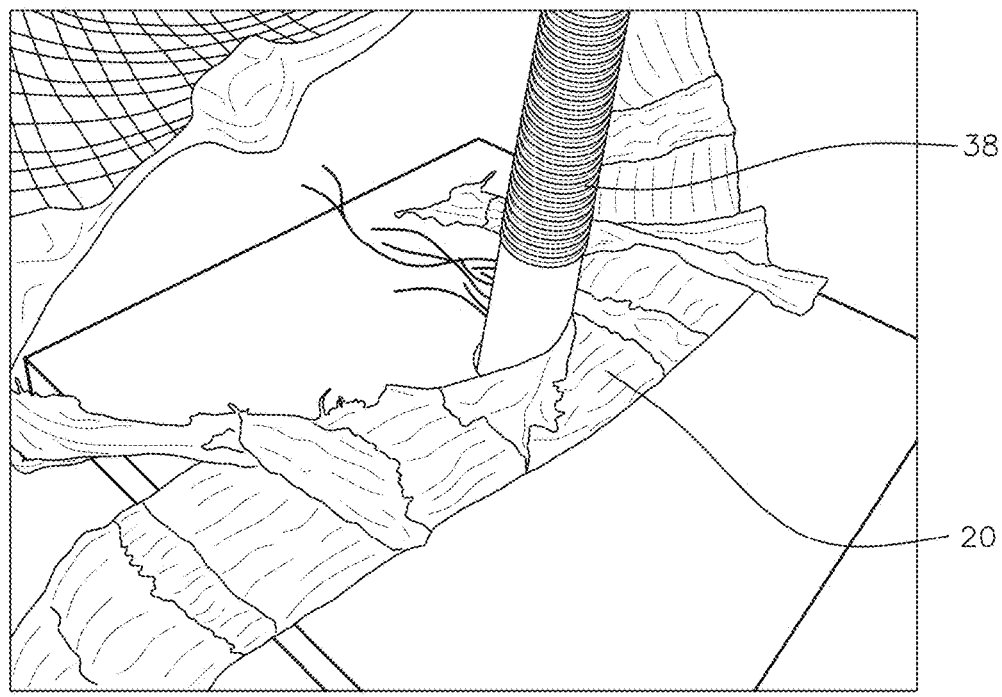
FIGS. 11D and 11E illustrate the reinforcing band after the completion of Test 4.
Figure 11E:
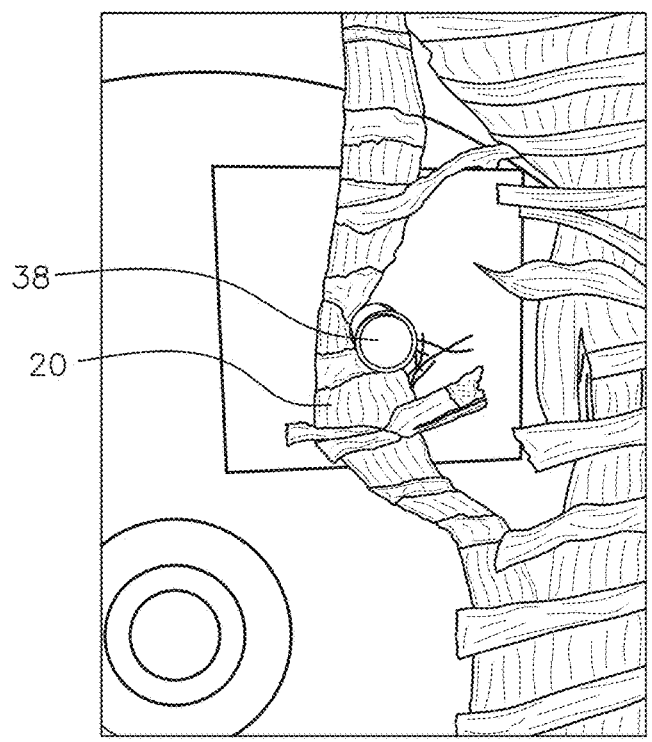

In Test 4, referred to as the "200 by 200 Midstrap Doublewood" test, the installation sequence for the product sample was 1) holy board; 2) mesh; 3) holy board; and 4) bolt plate. Two bolts 38 were placed outside of the reinforcing strap 20 with the mesh double-folded underneath, and two bolts 38 were placed through the reinforcing strap 20. The peak load was 17670 lbf, displacement at peak load was 13.2 inches, and maximum displacement was 18.4 inches. Illustrations showing the start and finish of Test 4 are set forth in FIGS. 11A and 11B, respectively. A graph of the load (lbf) versus displacement (in) for the 200 by 200 Midstrap Doublewood test is shown in FIG. 11C. Illustrations of the strap performance at the conclusion of Test 4 are provided in FIGS. 11D and 11E.

Figure 12A:
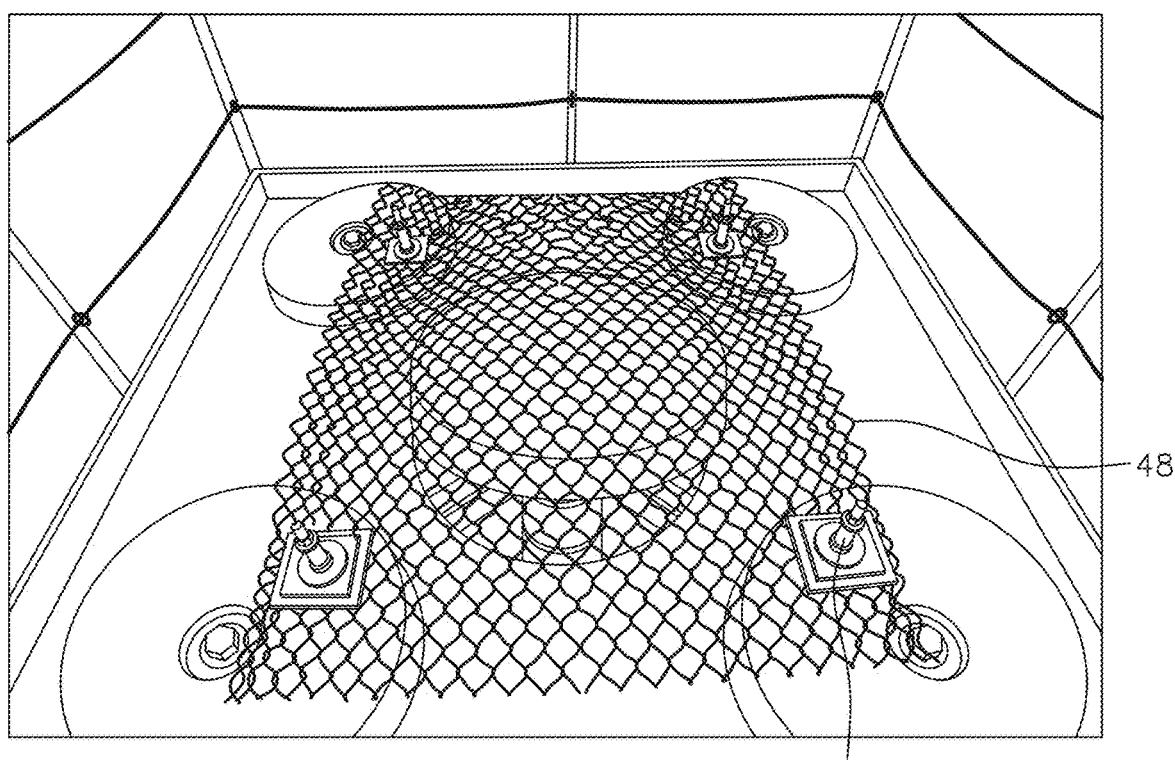
FIGS. 12A and 12B illustrate the start and finish, respectively, of a chain link fencing test.
Figure 12B:
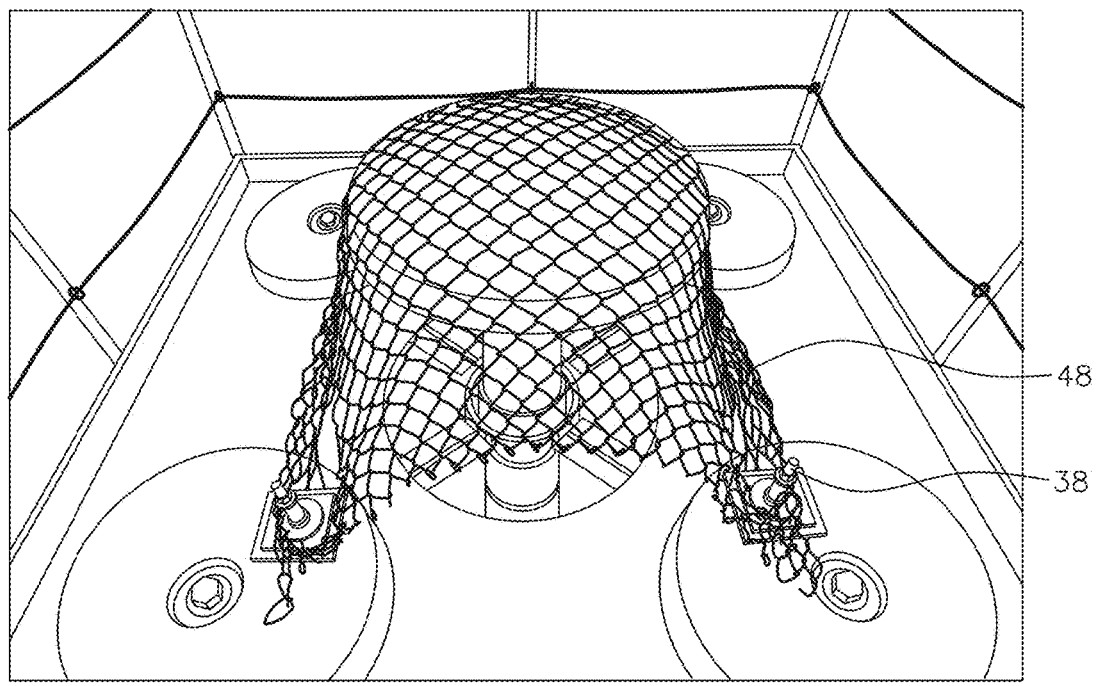
Figure 12C:
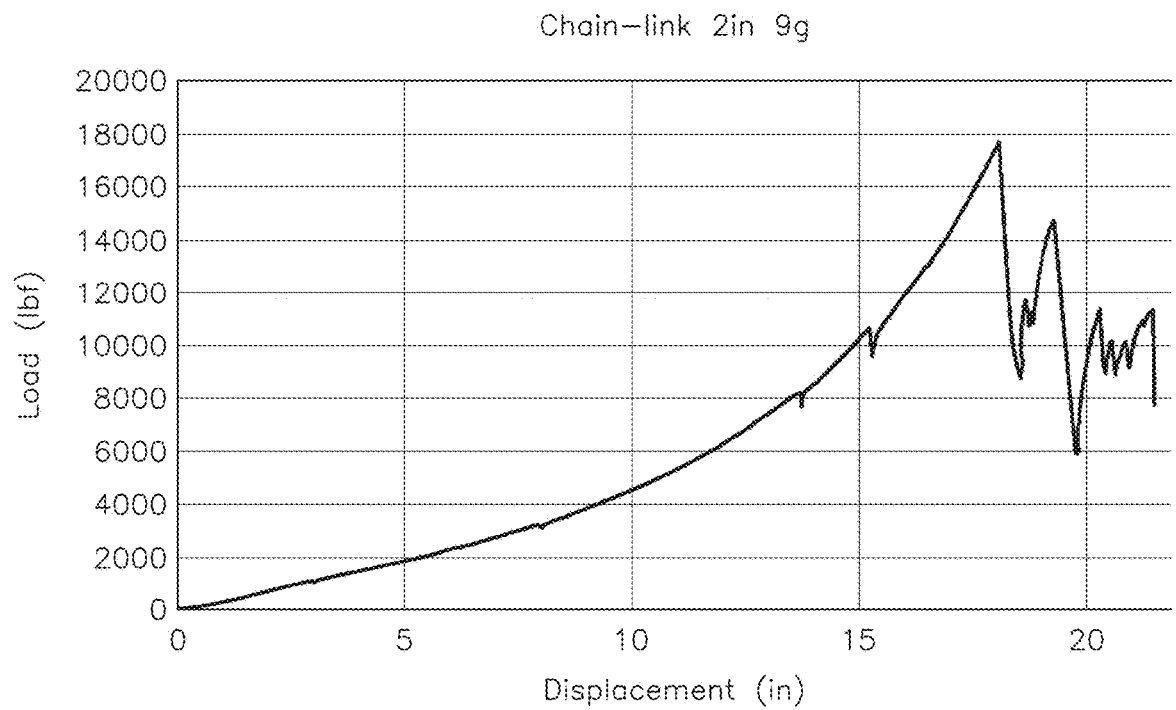
FIG. 12C is a graph of the load (lbf) versus displacement (in) results of the chain link fencing test as shown in FIG. 12B.

In addition to the polymer mesh tests, a chain-link fencing test with 2-inch aperture and 9 gauge wire was also conducted. For the chain-link fencing test, the installation sequence was 1) mesh; and 2) bolt plate. Each bolt 38 was placed equidistant from each corner of a 6' by 6' chain-link fence sample 48. The peak load was 17640 lbf, displacement at peak load was 18.1 inches, and maximum displacement was 21.5 inches. Illustrations showing the start and finish of the chain-link fencing test are set forth in FIGS. 12A and 12B, respectively. A graph of the load (lbf) versus displacement (in) of the chain-link fencing test is shown in FIG. 12C.

Figure 13:
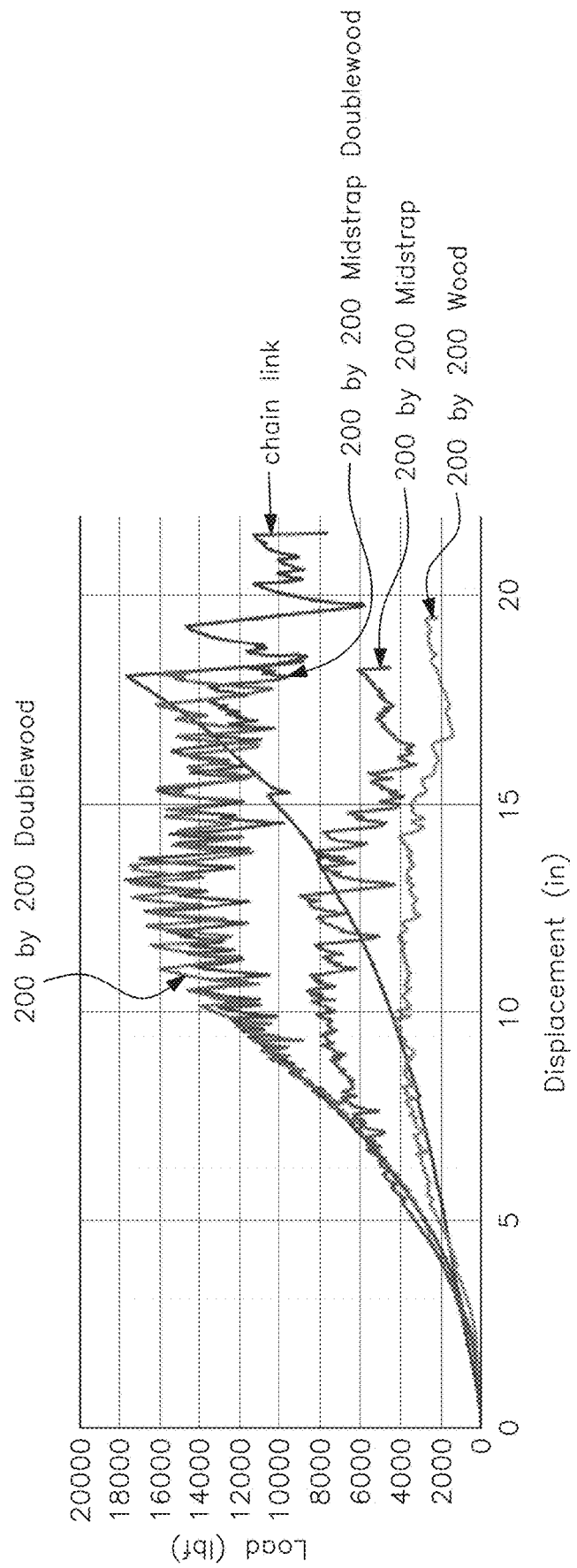
FIG. 13 is a graph comparing the test results obtained in Tests 1-4 of the polymer mesh of the present invention against that of the chain link fencing.

FIG. 13 is a graph comparing the test results obtained in Tests 1-4 of the polymer mesh with reinforcing straps of the present invention against that of the chain-link fencing. As shown, the performance of the solid bands according to the present invention was comparable or superior to that of chain-link fencing when the bolts are positioned inside or through the reinforcing straps.

To summarize the results of Tests 1-4:
1) The mesh straps did not break during the testing.
2) Failures that occurred were due to stripping of the material at the bolt plate (see FIG. 8B).
3) The solid bands made a significant difference in the toughness around the bolt plate as far as resistance to stripping as well as cutting (see FIGS. 9D, 9E, 11D and 11E).
4) The bands were not cut by the bolt plate on the inner side toward the dome.
5) Doubling the mesh material over upon itself simulated a solid strap.
6) With no strap breakage, the 200×200 kn 2.5" pattern proved effective as a base material.

The polymer mesh according to the present invention can be made of polyester, polypropylene, co-polymer or HDPE compounds, either flame-retardant or non-flame-retardant. The polymer mesh may be manufactured using a knitted or woven design, knotted mesh, or any other suitable method of producing a mesh configuration. The strength range of the mesh may range from between 80 kn/m² by 80 kn/m² to up to 400 kn/m² by 400 kn/m². The unit kn/m² is a strength measurement that can be converted into lbs/ft, with there being 68.5 lbs/ft for every kn/m². Therefore, 80 kn/m² is equal to 5480 lbs/ft.

In addition, as an alternative construction the reinforced polymer mesh according to the present invention may be made with single bands provided the bands are of sufficient width to buffer the edges and corners of the steel plates in the manner as has been described herein. With such single bands, the mesh may be manufactured with pre-placed holes properly spaced for the bolts, or the user may create the holes by cutting or burning. However, while it is possible, this alternative embodiment is not preferred.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A polymer mesh for securing to a mine strata for skin control, said polymer mesh comprising:
    a plurality of polymer strands spaced from and substantially parallel with one another extending in a machine direction;
    a plurality of polymer strands spaced from and substantially parallel with one another extending in a cross-machine direction and intersecting the plurality of machine direction polymer strands to create a mesh structure; and
    at least one pair of substantially parallel solid bands having a length that extends in one of the machine and cross-machine directions, each of the solid bands being a band that includes a plurality of closely adjacent strands which together function as an uninterrupted single band, the pair of solid bands being separated by a distance of at least the diameter of an applicable bolt to create an elongated reinforced aperture between the bands, said reinforced aperture being traversed by the plurality of polymer strands that run transverse to the direction of the bands.

2. The polymer mesh as set forth in claim 1, wherein the pair of solid bands are substantially parallel and separated from one another by a distance of between about 1.5 inches and about 4 inches.

3. The polymer mesh as set forth in claim 1, wherein the solid bands extend in the machine direction, said reinforced aperture being traversed by the plurality of polymer strands that extend in the cross-machine direction.

4. The polymer mesh as set forth in claim 3, wherein said polymer mesh includes at least a first pair of bands and a second pair of bands that are substantially parallel with one another, each band having a width of at least about 2.5 inches, with the bands in a given pair being separated by a distance of between about 1.5 inches and about 4 inches to create a reinforced aperture defined by each pair, said first and second pairs of bands being spaced about 4 feet apart.

5. The polymer mesh as set forth in claim 1, wherein the solid bands extend in the cross-machine direction, said reinforced aperture being traversed by the plurality of polymer strands that extend in the machine direction.

6. The polymer mesh as set forth in claim 1, wherein the solid bands extend in both the machine direction and the cross-machine direction.

7. The polymer mesh as set forth in claim 1, wherein the solid bands are made in a single process with the polymer strands.

8. The polymer mesh as set forth in claim 1, wherein the pair of solid bands is further associated with a third band to create two elongated reinforced apertures, a first elongated aperture between the pair of bands and a second elongated aperture between one band of the pair and the third band.

9. The polymer mesh as set forth in claim 8, wherein the third band is separated from the one band of the pair by a distance of between about 1.5 inches and about 4 inches.

10. The polymer mesh as set forth in claim 1, wherein the polymer mesh is formed as a roll and is installed by unrolling the roll during installation or by cutting the roll into sheets which are then installed.

11. A polymer mesh formed as a roll to be secured to a mine roof or side wall for skin control, said polymer mesh comprising:
    a plurality of polymer strands spaced from and substantially parallel with one another extending in a machine direction;
    a plurality of polymer strands spaced from and substantially parallel with one another extending in a cross-machine direction and intersecting the plurality of machine direction polymer strands to create a mesh structure; and
    a plurality of pairs of solid reinforcing bands in spaced relationship in one of the machine and cross-machine directions, each of the solid reinforcing bands in the plurality of pairs being a band that includes a plurality of closely adjacent strands which together function as an uninterrupted single band, and a spaced interval between pairs corresponding with a bolt pattern spacing for installing the polymer mesh and securing a roof or side wall in a hard rock mining application.

12. The polymer mesh as set forth in claim 11, wherein each band in a pair is substantially parallel with the other band in said pair and separated therefrom by a distance of between about 1.5 inches and about 4 inches to create an elongated reinforced aperture between the bands, said reinforced aperture being traversed by the plurality of polymer strands that run transverse to the direction of the bands.

13. The polymer mesh as set forth in claim 12, wherein the reinforcing bands are made of polyester, polypropylene, co-polymer or HDPE compounds in a single process with the polymer strands.

14. A polymer mesh for securing in a mine strata for skin control with bolts and associated steel plates, said polymer mesh comprising:
    a plurality of polymer strands spaced from and substantially parallel with one another extending in a machine direction;
    a plurality of polymer strands spaced from and substantially parallel with one another extending in a cross-machine direction and intersecting the plurality of machine direction polymer strands to create a mesh structure; and
    at least one pair of substantially parallel solid bands having a length that extends in one of the machine and cross-machine directions, the pair of solid bands each being a band that includes a plurality of closely adjacent strands which together function as an uninterrupted single band, and being separated by a distance sized to accommodate a size of the associated steel plates such that at least two opposed sides of said plates rest on top of the bands.

15. The polymer mesh as set forth in claim 14, wherein the plates are generally rectangular and all four corners of the plates also rest on top of the bands.

* * * * *